(12) United States Patent
Peng

(10) Patent No.: US 11,444,423 B2
(45) Date of Patent: Sep. 13, 2022

(54) METHOD FOR MANUFACTURING CONNECTOR

(71) Applicant: DONGGUAN LEADER PRECISION INDUSTRY CO., LTD, Dongguan (CN)

(72) Inventor: MengJie Peng, Dongguan (CN)

(73) Assignee: DONGGUAN LEADER PRECISION INDUSTRY CO., LTD, Dongguan (CN)

( * ) Notice: Subject to any disclaimer, the term of this patent is extended or adjusted under 35 U.S.C. 154(b) by 126 days.

(21) Appl. No.: 16/890,725

(22) Filed: Jun. 2, 2020

(65) Prior Publication Data

US 2021/0143599 A1    May 13, 2021

(30) Foreign Application Priority Data

Nov. 8, 2019    (CN) .......................... 201911090297.4

(51) Int. Cl.
| | |
|---|---|
| H01R 43/00 | (2006.01) |
| B29C 45/14 | (2006.01) |
| H01R 43/18 | (2006.01) |
| H01R 43/24 | (2006.01) |
| B29K 83/00 | (2006.01) |
| B29L 31/36 | (2006.01) |

(52) U.S. Cl.
CPC ........... H01R 43/005 (2013.01); B29C 45/14 (2013.01); H01R 43/18 (2013.01); H01R 43/24 (2013.01);

(Continued)

(58) Field of Classification Search
CPC ...... H01R 43/005; H01R 43/18; H01R 43/24; H01R 13/405; H01R 13/521;
(Continued)

(56) References Cited

U.S. PATENT DOCUMENTS 5,677,066 A * 10/1997 Okazaki ............. H01R 13/5216
                                                     428/439
9,853,393 B2 * 12/2017 Guo .................... H01R 13/5219
(Continued)

FOREIGN PATENT DOCUMENTS

| CN | 206947601 U | 1/2018 |
| CN | 207116802 U | 3/2018 |

(Continued)

*Primary Examiner* — Donghai D Nguyen
(74) *Attorney, Agent, or Firm* — Birch, Stewart, Kolasch & Birch, LLP

(57) ABSTRACT

The present disclosure provides a method for manufacturing connector, comprising steps of: Obtaining a terminal module comprising a terminal body and a plurality of terminals, wherein the terminal body comprises an interface part, a hollow area, and an electrical connecting part, the hollow area is disposed between the interface part and the electrical connecting part, the plurality of terminals is disposed on the terminal body, each terminal passes through the interface part, the hollow area, and the electrical connecting part. Assembling a housing on the terminal module, wherein the hollow area passed by the plurality of the terminals is exposed from the housing. Inject-molding a waterproof block into the hollow area, wherein the waterproof block encases the plurality of the terminals disposed in the hollow area, the waterproof block is disposed between the interface part and the electrical connecting part.

19 Claims, 13 Drawing Sheets

(52) U.S. Cl.
CPC ....... *B29K 2083/00* (2013.01); *B29L 2031/36* (2013.01)

(58) Field of Classification Search
CPC . H01R 13/5219; B29L 2031/36; B29C 45/14;
B29C 45/14639; B29C 2045/14459;
Y10T 29/49208; Y10T 29/4922
USPC .......................................... 29/874, 876, 883
See application file for complete search history.

(56) References Cited

U.S. PATENT DOCUMENTS

2016/0104957 A1* 4/2016 Kim ................... H01R 13/5219
439/78
2016/0164218 A1 6/2016 Lee

FOREIGN PATENT DOCUMENTS

| CN | 108110498 A | 6/2018 |
| CN | 207542469 U | 6/2018 |
| CN | 109449634 A | 3/2019 |
| CN | 109687224 A | 4/2019 |
| JP | 2009-87838 A | 4/2009 |
| JP | 2016-139526 A | 8/2016 |
| JP | 2019-21531 A | 2/2019 |
| JP | 2019-75301 A | 5/2019 |
| TW | M556031 U | 2/2018 |

\* cited by examiner

METHOD FOR MANUFACTURING CONNECTOR

CROSS REFERENCE TO RELATED APPLICATION

This application claims the priority benefit of Chinese Patent Application Serial Number CN201911090297.4, filed on Nov. 8, 2019, the full disclosure of which is incorporated herein by reference.

BACKGROUND

Technical Field

The present disclosure relates to the technical field of connector, and more particularly to a method for manufacturing connector.

Related Art

Conventionally, most of waterproof structures of connectors are formed by spraying or dispensing glues. Colloids are disposed in the area that needs to be waterproofed by spraying or dispensing glues to form the waterproof structures. Disadvantages of waterproof structures formed by spraying or dispensing are described as follows.

Regarding the disadvantages of spraying: 1. expensive sprayers are not affordable for every manufacturer; 2. the spraying nozzle of the sprayer is easily clogged during operation, making maintenance and repair difficult and causing extra cost; 3. difficulty of production is raised as it is hard to clean residual glue on the product during spraying; 4. silicon glue with high cost and high viscosity is likely being solidified unintentionally, resulting in unnecessary waste; and 5. extra cost is raised due to baking the product to shorten the solidification time of the glue.

Regarding the disadvantages of dispensing: 1. expensive dispensers are not affordable for every manufacturer; 2. dispensers are of low efficiency; 3. colloid has poor airtightness as air bubbles are easily formed in the colloid due to air pressure dispensing during the dispending process; 4. the glue is easy to be dispensed onto unexpected area of the surface of the product making the surface sticky during dispensing; 5. silicon glue with high cost and high viscosity is likely being solidified unintentionally, resulting in unnecessary waste; and 6. extra cost is raised due to baking the product to shorten the solidification time of the glue.

The waterproof structures of connectors made by spraying or dispensing would seem to have issues of high cost and low efficiency as described above, which are not conducive to the production of connectors.

SUMMARY

The embodiments of the present disclosure provide a method for manufacturing connectors intend to solve the high cost and low-efficiency issues of manufacturing connectors by spraying or dispensing.

The present disclosure provides a method for manufacturing a connector, comprising: firstly obtaining a terminal module comprising a terminal body and a plurality of terminals, wherein the terminal body comprises an interface part, a hollow area, and an electrical connecting part; the hollow area being disposed between the interface part and the electrical connecting part; the plurality of terminals is disposed on the terminal body; and each terminal passing through the interface part, the hollow area, and the electrical connecting part; secondly assembling a housing on the terminal module, wherein the hollow area passed by the plurality of the terminals is exposed from the housing; and thirdly inject-molding a waterproof block into the hollow area, wherein the waterproof block encases the plurality of the terminals disposed in the hollow area; and the waterproof block is disposed between the interface part and the electrical connecting part.

In the embodiments of the present disclosure, the waterproof block could encase the plurality of the exposed terminals by inject-molding the waterproof block into the area that needs to be waterproofed after combining the housing and the terminal module into a connector, so as to make the waterproof structure for the connector. By following the method above, the waterproof structure of the present disclosure could be precisely positioned, the baking process could be omitted, and the production efficiency could be enhanced as the solidification and manufacturing time could be extraordinary decreased.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
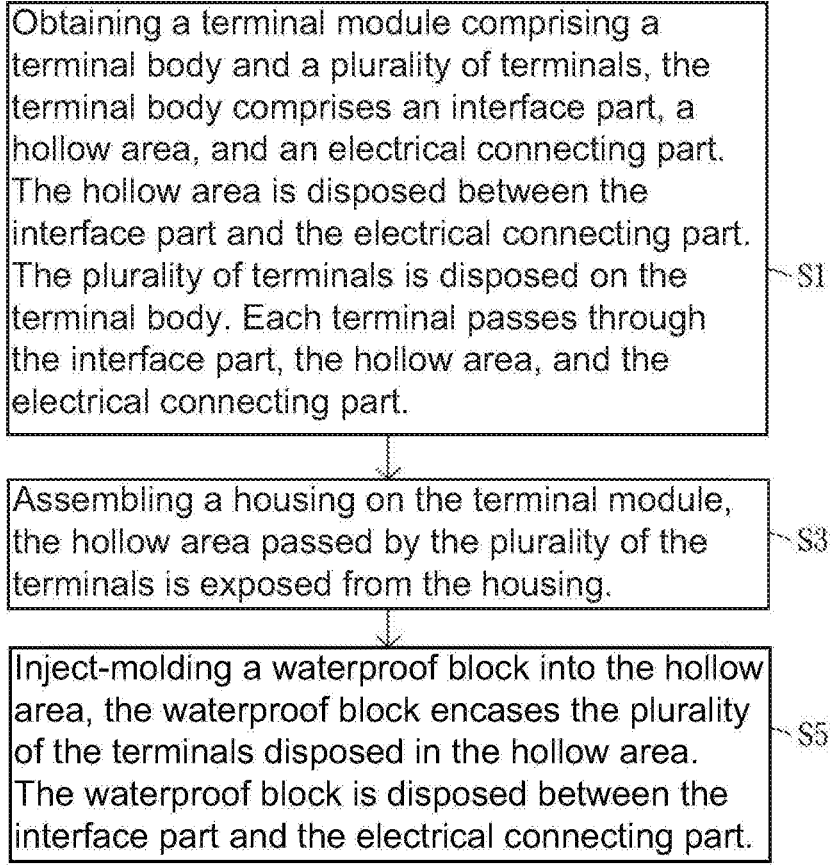
FIG. 1 is a flowchart of the production steps of a connector of the first embodiment of the present disclosure.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

Figure 2:
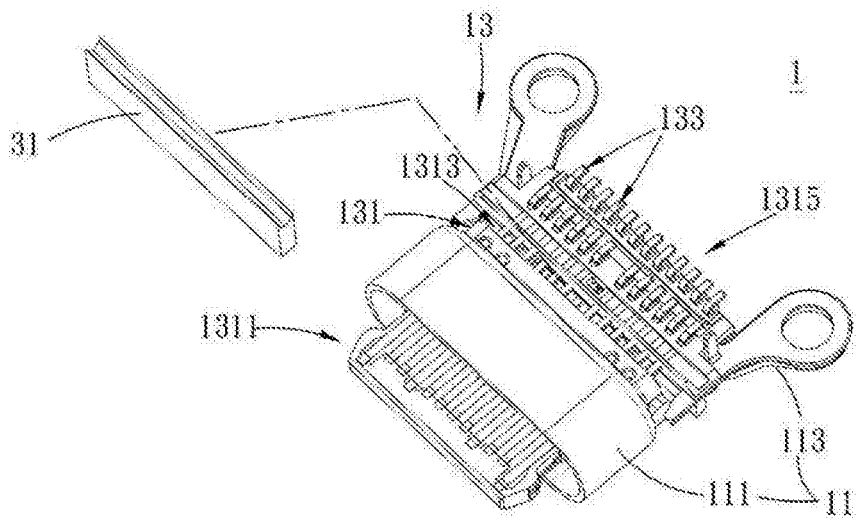
FIG. 2 is a schematic diagram of a connector with an injected colloid of the first embodiment of the present disclosure.

FIG. 1 is a flowchart of the production steps of a connector of the first embodiment of the present disclosure. FIG. 2 is a schematic diagram oft a connector with an injected colloid of the first embodiment of the present disclosure. As shown in the figures, the steps of the method for manufacturing the connector 1 of this embodiment are described as follows. In step S1, a terminal module 13 comprising a terminal body 131 and a plurality of terminals 133 is obtained, wherein the terminal body 131 comprises an interface part 1311, a hollow area 1313, and an electrical connecting part 1315. The hollow area 1313 is disposed between the interface part 1311 and the electrical connecting part 1315. The plurality of terminals 133 is disposed on the terminal body 131. Each terminal 133 passes through the interface part 1311, the hollow area 1313, and the electrical connecting part 1315.

In step S3, a housing 11 is assembled on the terminal module 13, wherein the hollow area 1313 passed by the plurality of the terminals 133 is exposed from the housing 11.

In step S5, a waterproof block 31 is inject-molded into the hollow area 1313, wherein the waterproof block 31 encases the plurality of the terminals 133 disposed in the hollow area 1313. The waterproof block 31 is disposed between the interface part 1311 and the electrical connecting part 1315.

Figure 3:
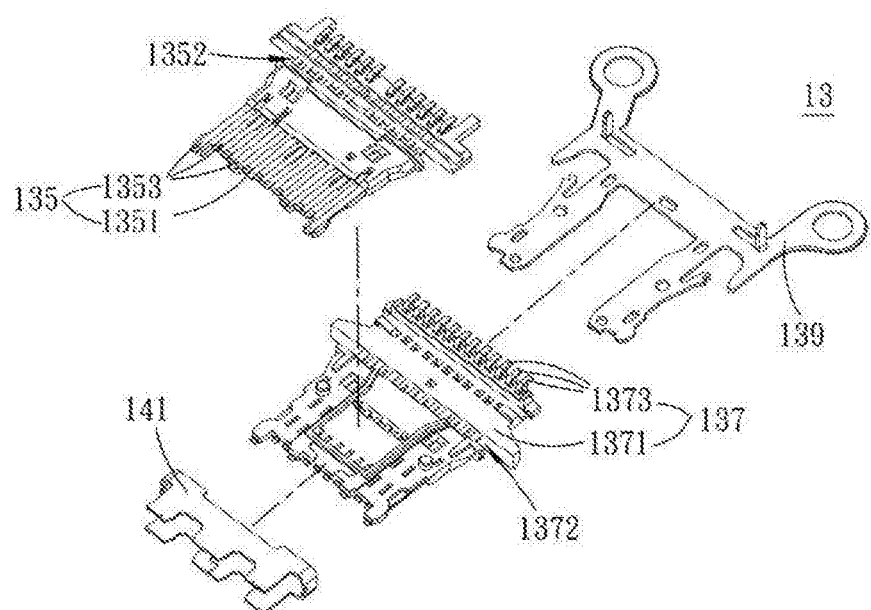
FIG. 3 is an exploded view of the terminal module of a connector of the first embodiment of the present disclosure.

FIG. 3 is an exploded view of the terminal module of a connector of the first embodiment of the present disclosure. In this embodiment, the terminal module 13 is first assembled. The terminal module 13 comprises a first terminal component 135, a second terminal component 137, an intermediate plate 139, and a securing ring 141. The first terminal component 135 comprises a first terminal board 1351 and a first terminal 1353. The first terminal board 1351 comprises a first hollow area 1352. The first terminal 1353 is disposed on the first terminal board 1351. A part of the first terminal 1353 passes through the first hollow area 1352. The second terminal component 137 comprises a second terminal board 1371 and a second terminal 1373. The second terminal board 1371 comprises a second hollow area 1372. The second terminal 1373 is disposed on the second terminal board 1371. A part of the second terminal 1373 passes through the second hollow area 1372. The intermediate plate 139 is disposed between the first terminal component 135 and the second terminal component 137. The first terminal component 135 is disposed above the second terminal component 137. The first hollow area 1352 of the first terminal component 135 communicates with the second hollow area 1372 of the second terminal component 137 to form a hollow area 1313. The first terminal 1353 and the second terminal 1373 are both exposed in the hollow area 1313. The securing ring 141 is sleeved between the first terminal component 135, the intermediate plate 139, and the second terminal component 137. The first terminal board 1351, the second terminal board 1371, the intermediate plate 139, and the securing ring 141 constitute the terminal body 131 of the terminal module 13. The first terminal 1353 and the second terminal 1373 constitute the terminal 133 of the terminal module 13.

Figure 4:
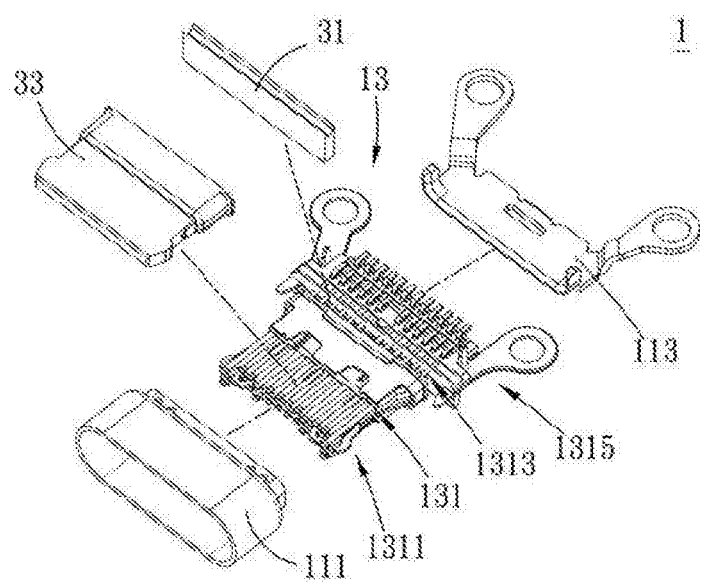
FIG. 4 is an exploded view of a connector of the first embodiment of the present disclosure.

FIG. 4 is an exploded view of a connector of the first embodiment of the present disclosure. As shown in the figure, after the terminal body 131 of the terminal module 13 is assembled, the terminal body 131 is divided into three areas, which are the interface part 1311, the hollow area 1313, and the electrical connecting part 1315. Then a colloid 33 is inject-molded to encase the interface part 1311 and the securing ring 141, to make the first terminal component 135, the intermediate plate 139, the second terminal component 137 and the front end of the securing ring 141 secured to form a tongue plate.

Then, the housing 11 is mounted onto the terminal module 13. The housing 11 comprises a first housing 111 and a second housing 113. The first housing 111 is sleeved on the terminal module 13 from one end of the tongue plate. The second housing 113 is mounted to the terminal module 13 from one end of the terminal module 13 away from the tongue plate. The hollow area 1313 passed by a plurality of the first terminals 1353 and a plurality of the second terminals 1373 is exposed from the top of the housing 11. The step of inject-molding the waterproof block 31 is performed by injecting from the top of the housing 11 into the hollow area 1313, but it is not limited thereto. In some embodiment, the hollow region 1313 can be exposed from other directions of the housing 11. The waterproof block 31 can be inject-molded from other directions of the housing 11 into the hollow area 1313 when injecting.

Figure 5:
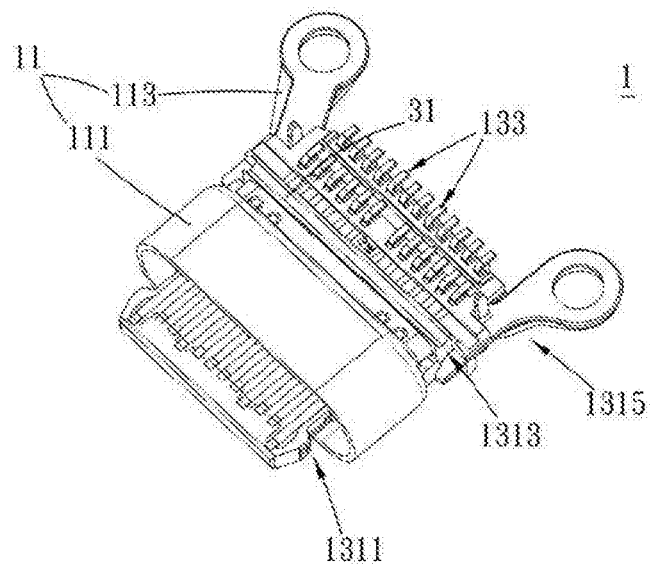
FIG. 5 is a schematic diagram of a connector of the first embodiment of the present disclosure.
Figure 6:
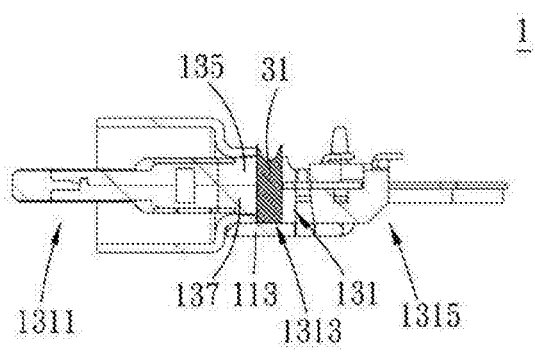
FIG. 6 is a cross-sectional view of a connector of the first embodiment of the present disclosure.

FIG. 5 is a schematic diagram of a connector of the first embodiment of the present disclosure. FIG. 6 is a cross-sectional view of a connector of the first embodiment of the present disclosure. As shown in the figure, the colloid (such as liquid silicone or materials according to user requirements) is injected into the hollow area 1313 to fill the colloid into the first hollow area 1352 of the first terminal component 135 and the second hollow area 1372 of the second terminal component 137. The colloid then turns into the waterproof block 31 in the hollow area 1313 and encases the plurality of the terminals 133 in the hollow area 1313. The front and rear surfaces and two side surfaces of the waterproof block 31 are in contact with the terminal body 131, that is, the waterproof block 31 is disposed in the middle of the terminal body 131, and the waterproof block 31 is disposed between the interface part 1311 and the electrical connecting part 1315. The bottom surface of the waterproof block 31 is in contact with the housing 11, that is, the waterproof block 31 is disposed on the second housing 113. The top surface of the waterproof block 31 is exposed outside the housing 11.

Therefore, the waterproof block 31 blocks the communication of the channel between the interface part 1311 and the electrical connecting part 1315. In this way, the waterproof block 31 can effectively prevent moisture which is harmful to the electronic components of the electrical connecting part 1315 of the terminal module 13 from entering through the interface part 1311 of the terminal module 13.

This embodiment improves the disadvantages of the conventional spraying, dispensing or pouring of glues that requires a time-consuming process of solidification of waterproof colloid before waterproof or airtightness tests or related process can be performed. Thus, the present disclosure provides a method for manufacturing connector. The waterproof block 31 is inject-molded by injecting colloid (such as liquid silicone) into a position inside the connector 1 where needs to be waterproofed. Based on the above method, the waterproof block 31 can be accurately and directly made right on the position required. Meanwhile, based on the inject-molding method of liquid silicone, the baking and solidification process could be omitted to reduce production costs. The manufactured connector 1 can be directly subjected to relevant testing processes such as the airtightness testing after wave soldering. This will help speed up the production process and improve production efficiency.

Figure 7:
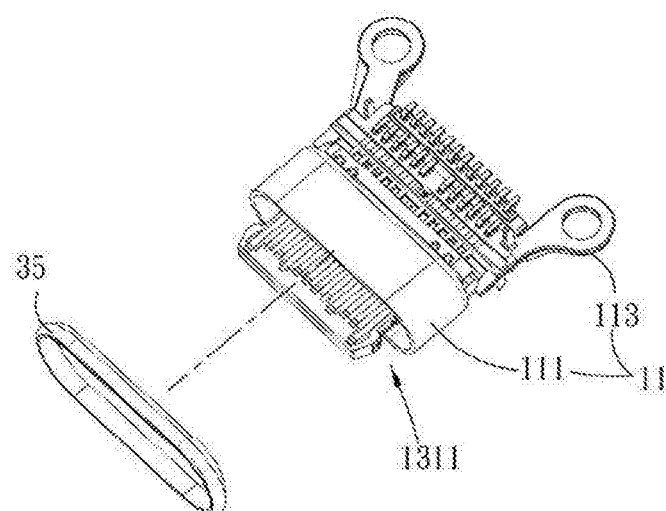
FIG. 7 is a schematic diagram of the waterproof ring of a connector of the first embodiment of the present disclosure.

FIG. 7 is a schematic diagram of the waterproof ring of a connector of the first embodiment of the present disclosure. As shown in the figure, in this embodiment, a waterproof ring 35 is further inject-molded on an outer wall of the housing 11 close to the interface part 1311 after step S5. In addition, in this embodiment, the steps of inject-molding the waterproof block 31 in the hollow area 1313 and inject-molding the waterproof ring 35 on the outer sidewall of the housing 11 close to the interface part 1311 are performed simultaneously in the same inject-molding process. This enables the waterproof block 31 and the waterproof ring 35 to be formed at the same time, which is conducive to saving production time and improving production efficiency.

Figure 8:
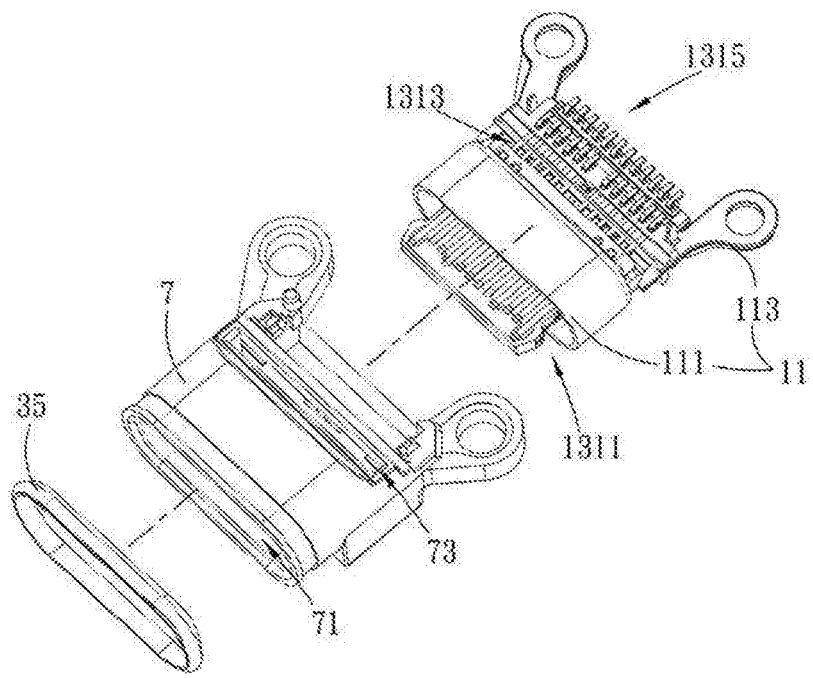
FIG. 8 is a schematic diagram of the waterproof housing of a connector of the first embodiment of the present disclosure.
Figure 9:
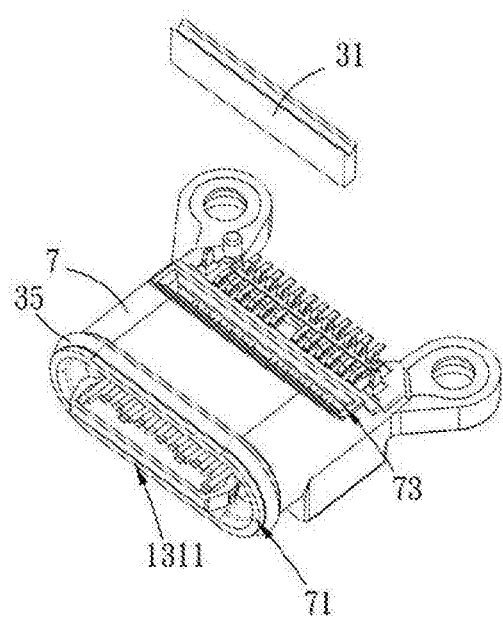
FIG. 9 is a schematic diagram of the waterproof housing with the injected colloid of a connector of the first embodiment of the present disclosure.
Figure 10:
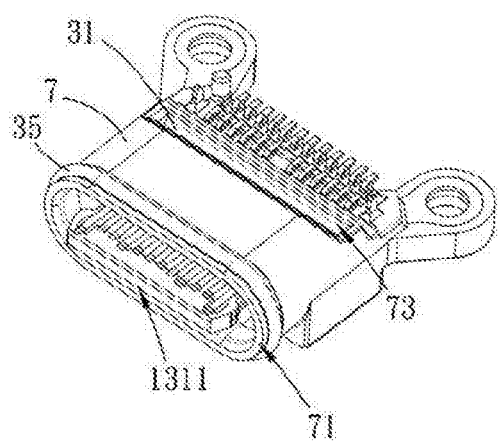
FIG. 10 is a schematic diagram of another connector of the first embodiment of the present disclosure.
Figure 11:
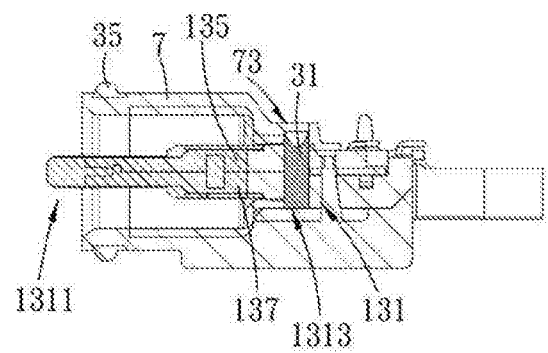
FIG. 11 is a cross-sectional view of another connector of the first embodiment of the present disclosure.

FIG. 8 is a schematic diagram of the waterproof housing of a connector of the first embodiment of the present disclosure. FIG. 9 is a schematic diagram of the waterproof housing with the injected colloid of a connector of the first embodiment of the present disclosure. FIG. 10 is a schematic diagram of another connector of the first embodiment of the present disclosure. FIG. 11 is a cross-sectional view of another connector of the first embodiment of the present disclosure. After step S1 of this embodiment, the casing 7 is inject-molded on the housing 11. The casing 7 encases the housing 11 and the terminal module 13. The hollow area 1313 passed by the plurality of terminals 133 is exposed from the casing 7. In the embodiment, the casing 7 (the waterproof case) comprises an opening 71 and a waterproof opening 73. The opening 71 corresponds to the interface part 1311. The waterproof opening 73 corresponds to the hollow area 1313 and communicates with the first hollow area 1352 and the second hollow area 1372. In this way, colloid (such as liquid silicone) can be injected into the hollow area 1313 from the waterproof opening 73 to make a waterproof block 31. In addition, the waterproof ring 35 can be inject-molded on the outer wall of the casing 7 close to the interface part 1311.

Therefore, the step of inject-molding the casing 7 on the housing 11 and the step of inject-molding the waterproof ring 35 on an outer wall of the casing 7 close to the interface part 1311 can be performed in the same inject-molding process. Furthermore, the step of inject-molding the waterproof block in the hollow area can be further simultaneously performed in the same inject-molding process with the above steps. In addition, the step of inject-molding the waterproof block 31 in the hollow area 1313 and the step of inject-molding the waterproof ring 35 on the outer wall of the casing 7 close to the interface part 131 can be performed simultaneously after performing the step of inject-molding the casing 7 on the housing 11. The above-mentioned simultaneous inject-molding method helps reduce production time and improve production efficiency.

Figure 12:
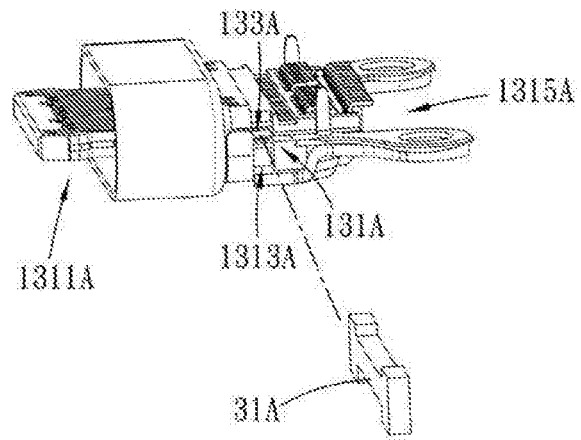
FIG. 12 is a schematic diagram of a connector with an injected colloid of the second embodiment of the present disclosure.
Figure 13:
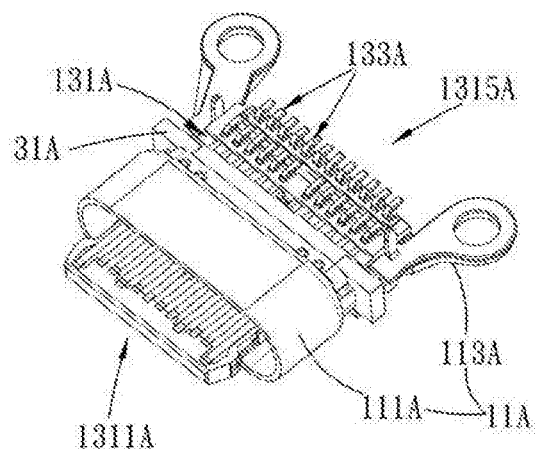
FIG. 13 is a schematic diagram of a connector of the second embodiment of the present disclosure.
Figure 14:
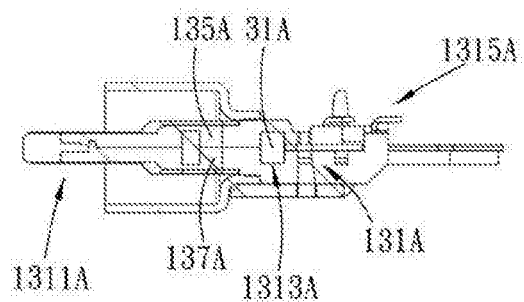
FIG. 14 is a cross-sectional view of a connector of the second embodiment of the present disclosure.

FIG. 12 is a schematic diagram of a connector with an injected colloid of the second embodiment of the present disclosure. FIG. 13 is a schematic diagram of a connector of the second embodiment of the present disclosure. FIG. 14 is a cross-sectional view of a connector of the second embodiment of the present disclosure. The difference between this embodiment and the first embodiment lies in the position of the inject-molded waterproof block. In this embodiment, the terminal module 13A comprises a terminal body 131A and a plurality of terminals 133A. The terminal body 131A comprises an interface part 1311A, a hollow area 1313A, and an electrical connecting part 1315A in an order from the front side to the rear side of the terminal body 131A. The housing 11A is disposed on the terminal module 13A. The hollow area 1313A passed by a plurality of terminals 133A is exposed from the side of the housing 11A. The step of inject-molding a waterproof block 31A is performed by injecting from the side of the housing 11A into the hollow area 1313A. The inject-molded colloid is filled in the hollow area 1313A to form the waterproof block 31A blocking the communication of the channel between the interface part 1311A of the terminal body 131A and the electrical connecting part 1315A of the terminal body 131A.

Figure 15:
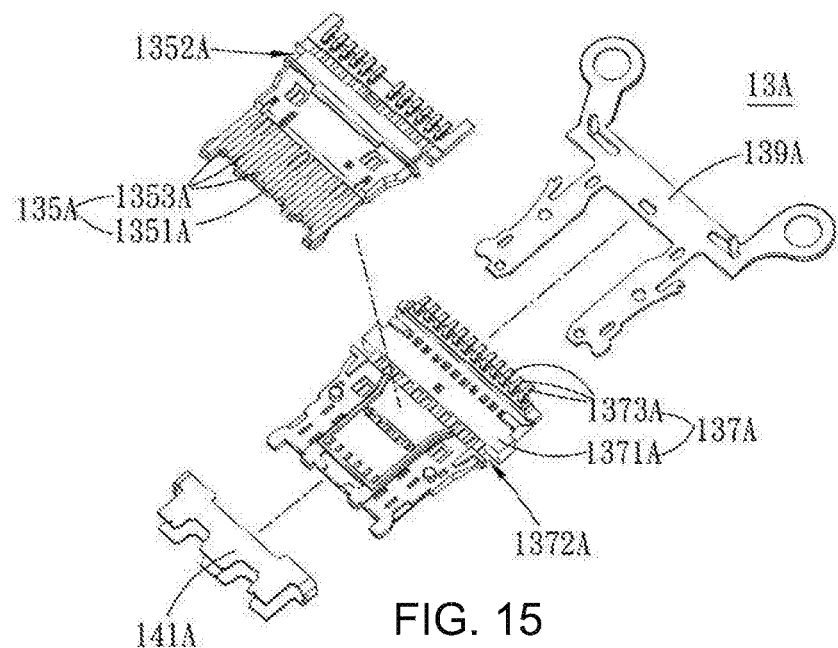
FIG. 15 is an exploded view of the terminal module of a connector of the second embodiment of the present disclosure.
Figure 16:
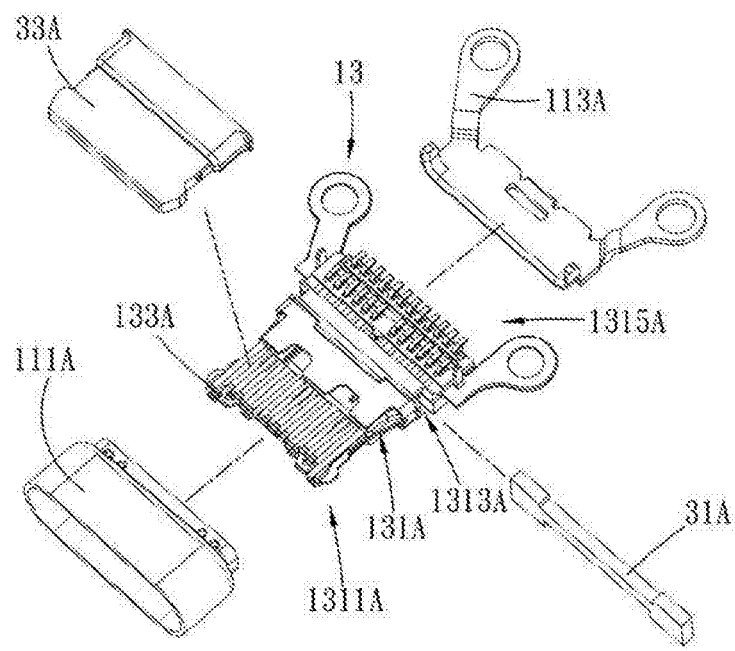
FIG. 16 is an exploded view of a connector of the second embodiment of the present disclosure.

FIG. 15 is an exploded view of the terminal module of a connector of the second embodiment of the present disclosure. FIG. 16 is an exploded view of a connector of the second embodiment of the present disclosure. In this embodiment, the terminal module 13A is assembled. The terminal module 13A comprises a first terminal component 135A, a second terminal component 137A, an intermediate plate 139A, and a securing ring 141A. The first terminal component 135A comprises a first terminal board 1351A and a first terminal 1353A. The first terminal board 1351A comprises a first groove 1352A. The first terminal 1353A is disposed on the first terminal board 1351A. The first terminal 1353A passes through the first groove 1352A. The second terminal component 137A comprises a second terminal board 1371A and a second terminal 1373A. The second terminal board 1371A comprises a second groove 1372A. The second terminal 1373A is disposed on the second terminal board 1371A. The second terminal 1373A passes through the second groove 1372A. The intermediate plate 139A is disposed between the first terminal component 135A and the second terminal component 137A. The first terminal component 135A is disposed above the second terminal component 137A. The first groove 1352A of the first terminal component 135A corresponds to the second groove 1372A of the second terminal component 137A. The first groove 1352A is combined with the second groove 1372A to form an accommodation space. The securing ring 141A is sleeved between the first terminal component 135A, the intermediate plate 139A, and the second terminal component 137A. The first terminal board 1351A, the second terminal board 1371A, the intermediate plate 139A, and the securing ring 141A constitute the terminal body 131A of the terminal module 13A. The first terminal 1353A and the second terminal 1373A constitute the terminal 133A of the terminal module 13A.

Therefore, after the terminal body 131A of the terminal module 13A is assembled, the terminal body 131A is divided into three areas, which are an interface part 1311A, a hollow area 1313A, and an electrical connecting part 1315A. Then a colloid 33A is inject-molded to encase the interface part 1311A and the securing ring 141A, to make the first terminal component 135A, the intermediate plate 139A, the second terminal component 137A and the front end of the securing ring 141A secured to form a tongue plate.

Then, the housing 11A is mounted onto the terminal module 13A. The housing 11A comprises a first housing 111A and a second housing 113A. The first housing 111A is sleeved on the terminal module 13A from one end of the tongue plate. The second housing 113A is mounted to the terminal module 13A on one end of the terminal module 13A away from the tongue plate. The hollow area 1313A passed by a plurality of first terminals 1353A and a plurality of second terminals 1373A is exposed from the top of the housing 11A when the first housing 111A and the second housing 113A are disposed on the terminal module 13A. The step of inject-molding the waterproof block 31A is performed by injecting from the side of the housing 11A into the hollow area 1313A. In this embodiment, the two opposite side surfaces of the housing 11A communicate with the hollow area 1313A.

The colloid (i.e. liquid silicone) is injected into the accommodating space from the side to fill the colloid (i.e. liquid silicone) into the first groove 1352A of the first terminal component 135A and the second groove 1372A of the second terminal component 137A. The colloid then turns into the waterproof block 31A in the hollow area 1313A and encases the plurality of terminals 133A in the hollow area 1313A. The front and rear surfaces and the top and bottom surfaces of the waterproof block 31A are in contact with the terminal body 131A. The two side surfaces of the waterproof block 31A are exposed outside the housing 11A.

The front and rear surfaces and two side surfaces of the waterproof block 31A are in contact with the terminal body 131A, that is, the waterproof block 31A is disposed in the middle of the terminal body 131A, and the waterproof block 31A is disposed between the interface part 1311A and the electrical connecting part 1315A. The bottom surface of the waterproof block 31A is in contact with the housing 11A, that is, the waterproof block 31A is disposed above the second housing 113A. The top surface of the waterproof block 31A is exposed outside the housing 11A. In this way, the waterproof block 31A can effectively prevent moisture which is harmful to the electronic components of the electrical connecting part 1315A of the terminal module 13A from entering through the interface part 1311A of the terminal module 13A.

Figure 17:
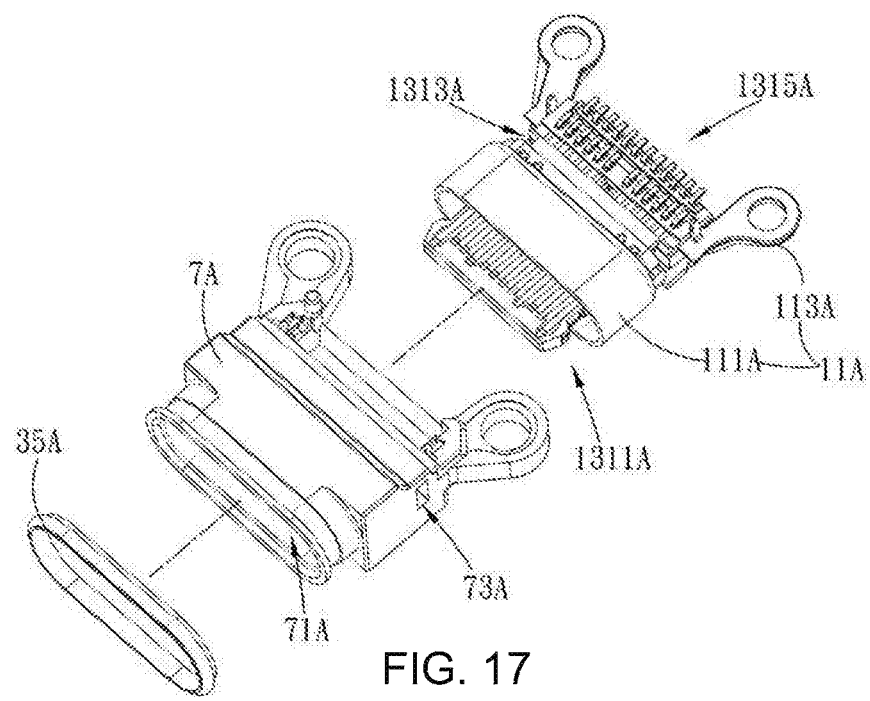
FIG. 17 is a schematic diagram of the waterproof housing and the waterproof ring of a connector of the second embodiment of the present disclosure.
Figure 18:
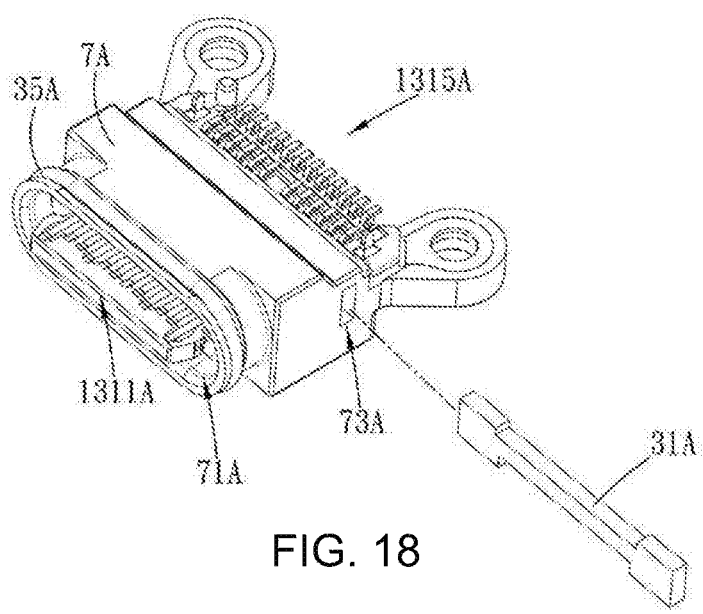
FIG. 18 is a schematic diagram of the waterproof housing with the injected colloid of a connector of the second embodiment of the present disclosure.
Figure 19:
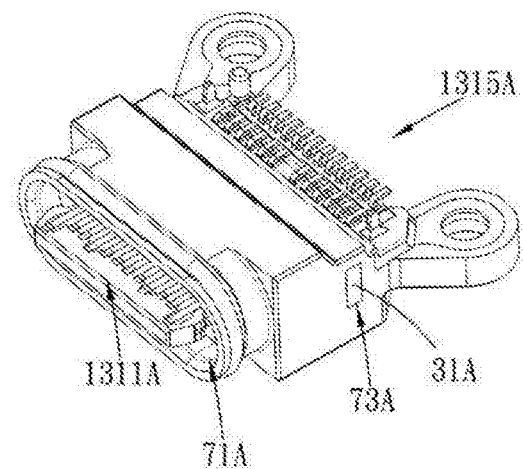
FIG. 19 is a schematic diagram of another connector of the second embodiment of the present disclosure.
Figure 20:
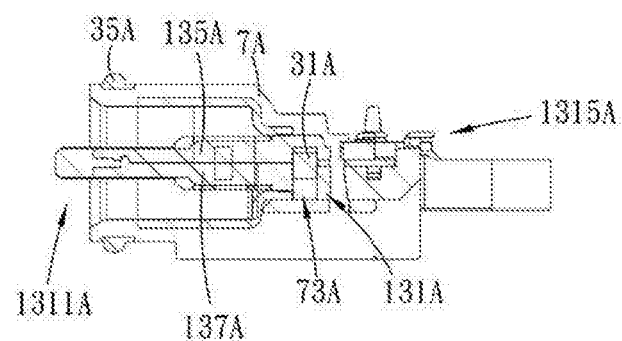
FIG. 20 is a cross-sectional view of another connector of the second embodiment of the present disclosure.

FIG. 17 is a schematic diagram of the waterproof housing with the injected colloid and the waterproof ring of a connector of the second embodiment of the present disclosure. FIG. 18 is a schematic diagram of the waterproof housing with the injected colloid of a connector of the second embodiment of the present disclosure. FIG. 19 is a schematic diagram of another connector of the second embodiment of the present disclosure. FIG. 20 is a cross-sectional view of another connector of the second embodiment of the present disclosure. A waterproof ring 35A in this embodiment is identical to the waterproof ring 35 described in the first embodiment, thus it would not be repeatedly described herein. This embodiment further performs the inject-molding of the casing 7A on the housing 11A. The casing 7A encases the housing 11A and the terminal module 13A. The hollow area 1313A passed by the plurality of terminals 133A is exposed from the casing 7A. In the embodiment, the casing 7A (i.e., waterproof case) comprises an opening 71A and a waterproof opening 73A. The opening 71A corresponds to the interface part 1311. The number of the waterproof opening 73A is two. The two waterproof openings 73A correspond to the two side surfaces of the hollow area 1313 and communicate with the first hollow area 1352A and the second hollow area 1372A. In this way, colloid (such as liquid silicone) can be injected into the hollow area 1313A from the waterproof openings 73A to make the waterproof block 31A. In addition, the waterproof ring 35A can be inject-molded on an outer wall of the casing 7A close to the interface part 1311A.

Therefore, the three steps of inject-molding the casing 7A on the housing 11A, inject-molding the waterproof ring 35A on the outer wall of the casing 7A close to the interface part 1311A, and inject-molding the waterproof block 31A into the hollow area 1313A are described in the first embodiment, thus it would not be repeatedly described herein. The steps of this embodiment can be performed in the same inject-molding process or in orders according to requirements, which is not limited in this embodiment.

Figure 21:
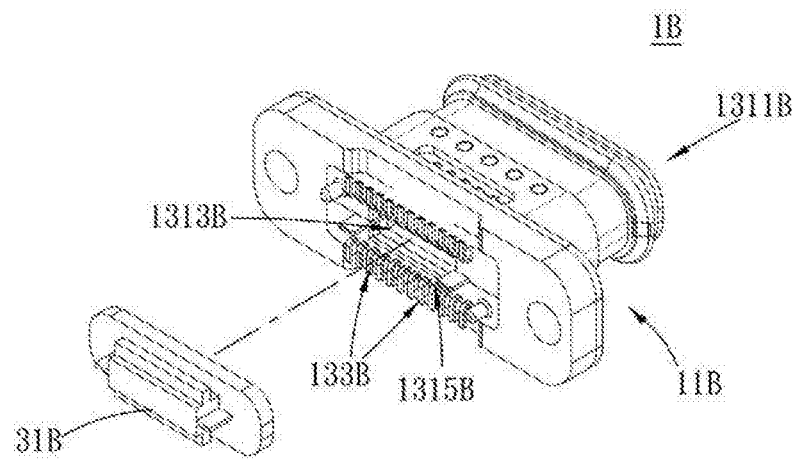
FIG. 21 is a schematic diagram of a connector with an injected colloid of the third embodiment of the present disclosure.
Figure 22:
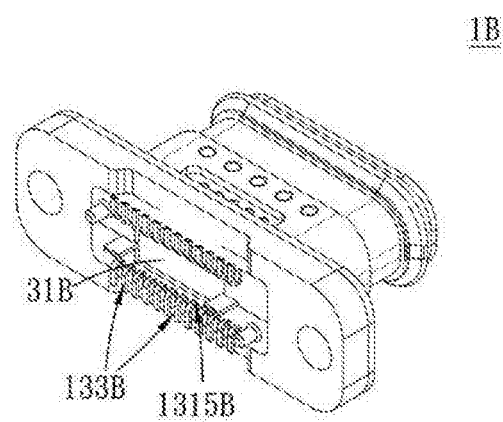
FIG. 22 is a schematic diagram of a connector of the third embodiment of the present disclosure.
Figure 23:
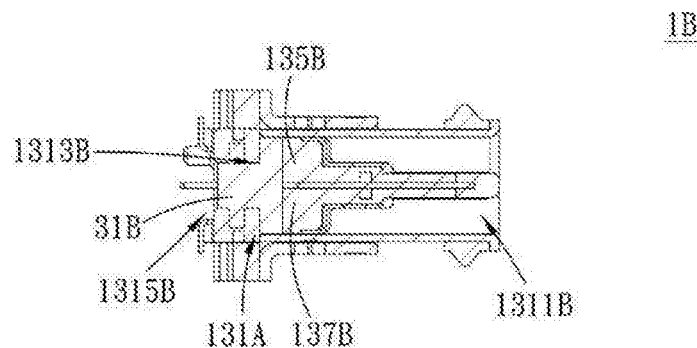
FIG. 23 is a cross-sectional view of a connector of the third embodiment of the present disclosure.

FIG. 21 is a schematic diagram of a connector with an injected colloid of the third embodiment of the present disclosure. FIG. 22 is a schematic diagram of a connector of the third embodiment of the present disclosure. FIG. 23 is a cross-sectional view of a connector of the third embodiment of the present disclosure. As shown in the figures, the difference between this embodiment and the first embodiment is that the position of the inject-molded waterproof block. In the embodiment, the connector 1B comprises a terminal module 13B. The terminal module 13B comprises a terminal body 131B and a plurality of terminals 133B. The terminal body 131B comprises an interface part 1311B, a hollow area 1313B, and an electrical connecting part 1315B in an order from the front side to the rear side. The housing 11B is disposed on the terminal module 13B. The hollow area 1313B passed by a plurality of terminals 133B is exposed from the rear side of the housing 11B. That is, to expose from one end of the housing 11B with the electrical connecting part 1315B. The step of inject-molding a waterproof block 31B is performed by injecting from the rear side of the housing 11B into the hollow area 1313B. The inject-molded colloid is filled in the hollow area 1313B to form the waterproof block 31B blocking the communication of the channel between the interface part 1311B of the terminal body 131B and the electrical connecting part 1315B of the terminal body 131B.

Figure 24:
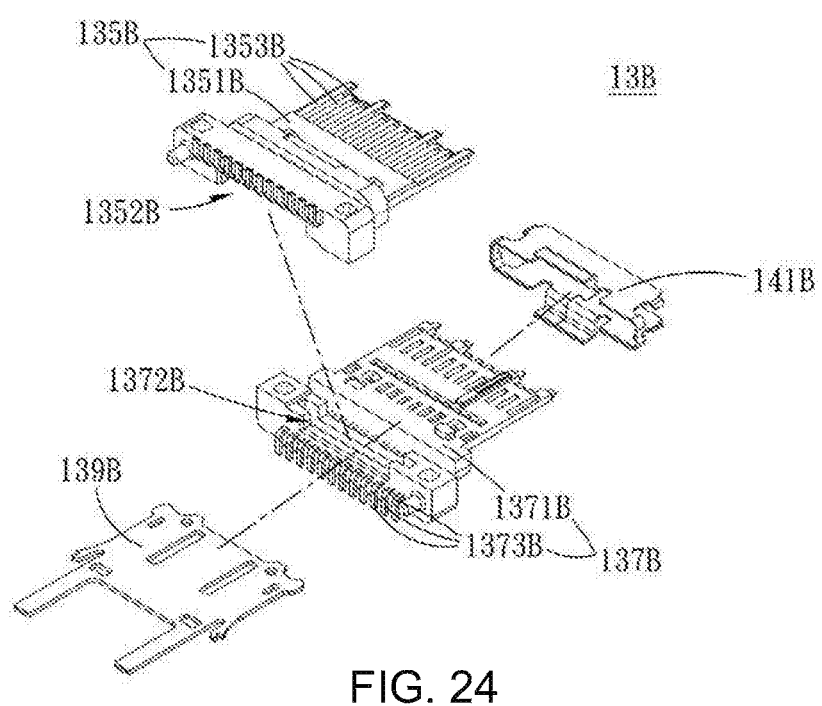
FIG. 24 is an exploded view of the terminal module of a connector of the third embodiment of the present disclosure.
Figure 25:
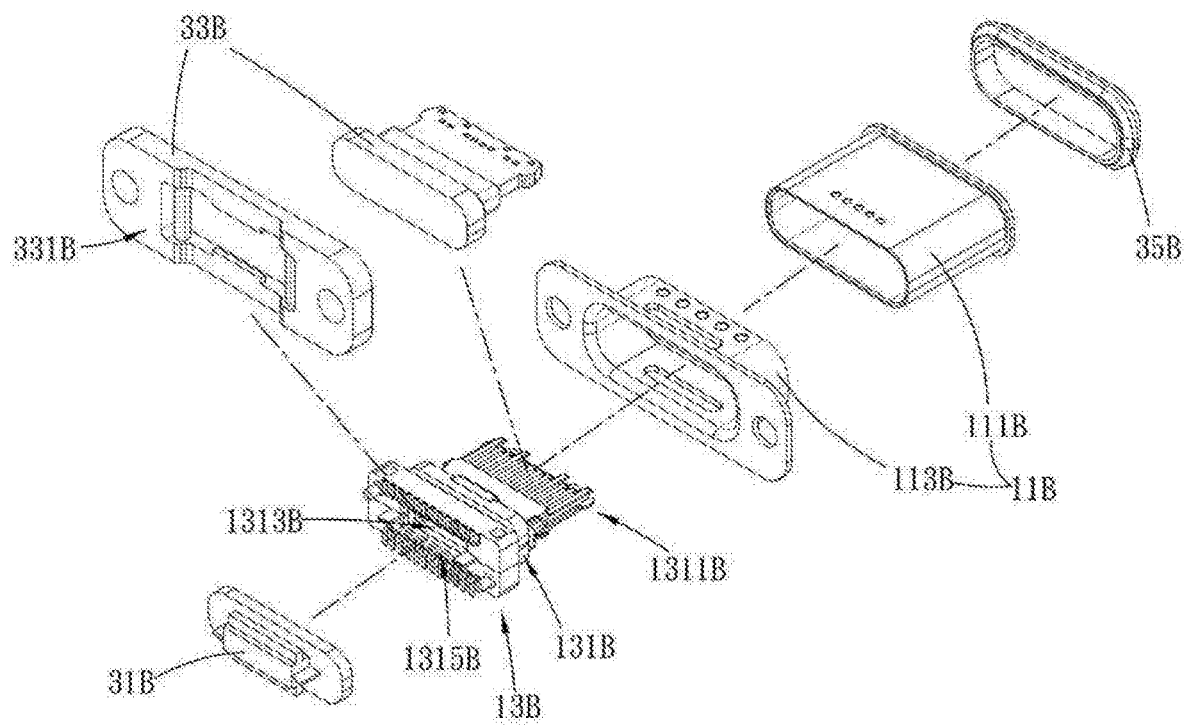
FIG. 25 is an exploded view of a connector of the third embodiment of the present disclosure.

FIG. 24 is an exploded view of the terminal module of a connector of the third embodiment of the present disclosure. FIG. 25 is an exploded view of a connector of the third embodiment of the present disclosure. In this embodiment, the terminal module 13B is assembled. The terminal module 13B comprises a first terminal component 135B, a second terminal component 137B, an intermediate plate 139B, and a securing ring 141B. The first terminal component 135B comprises a first terminal board 1351B and a first terminal 1353B. The first terminal board 1351B comprises a first recess 1352B. The first terminal 1353B is disposed on the first terminal board 1351B. Part of the first terminal 1353B is exposed from the first recessed 1352B. The second terminal component 137B comprises a second terminal board 1371B and a second terminal 1373B. The second terminal board 1371B comprises a second recess 1372B. The second terminal 1373B is disposed on the second terminal board 1371B. Part of the second terminal 1373B is exposed from the second recess 1372B. The intermediate plate 139B is disposed between the first terminal component 135B and the second terminal component 137B. The first terminal component 135B is disposed above the second terminal component 137B. The first recess 1352B of the first terminal component 135B is combined with the second recess 1372B of the second terminal component 137B to form an accommodation space. The securing ring 141B is sleeved between the first terminal board 1351B, the intermediate plate 139B, and the second terminal board 1371B to constitute the terminal body 131B of the terminal module 13B.

Therefore, after the terminal body 131B of the terminal module 13B is assembled, the terminal body 131B is divided into three areas, which are an interface part 1311B, a hollow area 1313B, and an electrical connecting part 1315B. Then a colloid 33B is inject-molded to encase the interface part 1311B and the securing ring 141B, to make the first terminal component 135B, the intermediate plate 139B, the second terminal component 137B and the front end of the securing ring 141B secured to form a tongue plate. Meanwhile, the colloid 33B is inject-molded on one end of the terminal body 131B with the electrical connecting part 1315B. The colloid 33B is inject-molded into the terminal body 131B to form a securing component 331B used to secure the housing 11B. Then, the housing 11B is assembled to the terminal module 13B. The housing 11B comprises a first housing 111B and a second housing 113B. Sequentially, the second housing 113B and then the first housing 111B are sleeved onto the terminal module 13B from one end of the tongue plate. The second housing 113B is secured on the securing component 331B.

The hollow area 1313B passed by a plurality of the first terminals 1353B and a plurality of the second terminals 1373B is exposed from the rear of the housing 11B when the first housing 111B and the second housing 113B are disposed on the terminal module 13B. The inject-molded waterproof block 31B is injected from the rear of the housing 11B (that is, the end with the electrical connecting part 1315B) into the hollow area 1313B.

The colloid (i.e. liquid silicone) is injected into the accommodating space from the rear to fill the colloid (i.e. liquid silicone) into the first recess 1352B of the first terminal component 135B and the second recess 1372B of the second terminal component 137B. The colloid then turns into the waterproof block 31B in the hollow area 1313B and encases the plurality of terminals 133B in the hollow area 1313B. The rear side surface of the waterproof block 31B is exposed outside the housing 11B. In this way, the waterproof block 31B can effectively prevent moisture which is harmful to the electronic components of the electrical connecting part 1315B of the terminal module 13B from entering through the interface part 1311B of the terminal module 13B.

A waterproof ring 35B is further inject-molded on an outer wall of the housing 11B close to the interface part 1311B in this embodiment. Moreover, the waterproof ring 35B can be inject-molded simultaneously when the injected colloid (such as liquid silicon) is inject-molded as the waterproof block 31B to reduce production time and improve production efficiency.

In summary, the present disclosure provides a method to produce a waterproof structure to be used in a connector by injecting liquid silicone into areas with terminals in the housing after assembling the housing and the terminal module into the connector. Based on the above method of the present disclosure, the waterproof structure can be precisely positioned, and the baking process can be omitted, so as to improve production efficiency and to reduce costs.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for manufacturing a connector, comprising:
   obtaining a terminal module comprising a terminal body and a plurality of terminals, wherein the terminal body comprises an interface part, a hollow area, and an electrical connecting part; the hollow area being disposed between the interface part and the electrical connecting part; the plurality of terminals being disposed on the terminal body; and each terminal passing through the interface part, the hollow area, and the electrical connecting part;
   assembling a housing on the terminal module, wherein the hollow area passed by the plurality of the terminals is exposed from the housing; and
   inject-molding a waterproof block into the hollow area, wherein the waterproof block encases the plurality of the terminals disposed in the hollow area; and the waterproof block is disposed between the interface part and the electrical connecting part;
   wherein the method further comprises: inject-molding a casing on the housing before inject-molding the waterproof block into the hollow area, wherein the casing encases the housing and the terminal body; and the hollow area passed by the plurality of the terminals is exposed from the casing.

2. The method for manufacturing connector according to claim 1, further comprising:
   inject-molding a waterproof ring on an outer wall of the housing close to the interface part.

3. The method for manufacturing connector according to claim 2, wherein the step of inject-molding the waterproof block into the hollow area and the step of inject-molding the waterproof ring on the outer wall of the housing close to the interface part are performed simultaneously in the same inject-molding process.

4. The method for manufacturing connector according to claim 1, further comprising:
   inject-molding a waterproof ring on an outer wall of the casing close to the interface part.

5. The method for manufacturing connector according to claim 4, wherein the step of inject-molding the casing on the housing and the step of inject-molding the waterproof ring on the outer wall of the casing close to the interface part are performed in the same inject-molding process.

6. The method for manufacturing connector according to claim 4, wherein the step of inject-molding the casing on the housing, the step of inject-molding the waterproof block into the hollow area, and the step of inject-molding the waterproof ring on the outer wall of the casing close to the interface part are performed in the same inject-molding process.

7. The method for manufacturing connector according to claim 4, wherein the step of inject-molding the waterproof block into the hollow area and the step of inject-molding the waterproof ring on the outer wall of the casing close to the interface part are performed simultaneously in the same inject-molding process.

8. The method for manufacturing connector according to claim 1, wherein a testing process is performed in the connector after the step of inject-molding the waterproof block into the hollow area.

9. The method for manufacturing connector according to claim 8, wherein wave soldering is performed followed by airtightness test in the testing process.

10. The method for manufacturing connector according to claim 1, wherein in the step of inject-molding the waterproof block into the hollow area, the hollow area passed by the plurality of the terminals is exposed from the top of the housing; and the step of inject-molding the waterproof block is performed by injecting from the top of the housing into the hollow area.

11. The method for manufacturing connector according to claim 10, wherein front and rear surfaces and two side surfaces of the waterproof block are in contact with the terminal body; a bottom surface of the waterproof block is in contact with the housing; and a top surface of the waterproof block is exposed outside the housing.

12. The method for manufacturing connector according to claim 1, wherein in the step of inject-molding the waterproof block into the hollow area, the hollow area passed by the plurality of the terminals is exposed from the side of the housing; and the step of inject-molding the waterproof block is performed by injecting from the side of the housing into the hollow area.

13. The method for manufacturing connector according to claim 12, wherein front, rear, top, and bottom surfaces of the waterproof block are in contact with the terminal body; and two side surfaces of the waterproof block are exposed outside the housing.

14. The method for manufacturing connector according to claim 1, wherein in the step of inject-molding the waterproof block into the hollow area, the hollow area passed by the plurality of the terminals is exposed from the rear of the housing; the step of inject-molding the waterproof block is performed by injecting from the rear of the housing into the hollow area.

15. The method for manufacturing connector according to claim 14, wherein a rear surface of the waterproof block are exposed outside the housing; other surfaces of the waterproof block are in contact with the terminal body.

16. A method for manufacturing a connector, comprising:
   obtaining a terminal module comprising a terminal body and a plurality of terminals, wherein the terminal body comprises an interface part, a hollow area, and an electrical connecting part; the hollow area being disposed between the interface part and the electrical connecting part; the plurality of terminals being disposed on the terminal body; and each terminal passing through the interface part, the hollow area, and the electrical connecting part;
   assembling a housing on the terminal module, wherein the hollow area passed by the plurality of the terminals is exposed from the housing;
   inject-molding a waterproof block into the hollow area, wherein the waterproof block encases the plurality of the terminals disposed in the hollow area; and the waterproof block is disposed between the interface part and the electrical connecting part; and
   inject-molding a waterproof ring on an outer wall of the housing close to the interface part;
   wherein the step of inject-molding the waterproof block into the hollow area and the step of inject-molding the waterproof ring on the outer wall of the housing close to the interface part are performed simultaneously in the same inject-molding process.

17. The method for manufacturing connector according to claim 16, wherein in the step of inject-molding the waterproof block into the hollow area, the hollow area passed by the plurality of the terminals is exposed from the top of the housing; and the step of inject-molding the waterproof block is performed by injecting from the top of the housing into the hollow area.

18. The method for manufacturing connector according to claim 16, wherein in the step of inject-molding the waterproof block into the hollow area, the hollow area passed by the plurality of the terminals is exposed from the side of the housing; and the step of inject-molding the waterproof block is performed by injecting from the side of the housing into the hollow area.

19. The method for manufacturing connector according to claim 16, wherein in the step of inject-molding the waterproof block into the hollow area, the hollow area passed by the plurality of the terminals is exposed from the rear of the housing; the step of inject-molding the waterproof block is performed by injecting from the rear of the housing into the hollow area.

\* \* \* \* \*